United States Patent
Gramss et al.

(10) Patent No.: US 6,991,006 B2
(45) Date of Patent: Jan. 31, 2006

(54) CLOSING DEVICE FOR A FILING TUBE OF A FUEL TANK IN AN AUTOMOBILE

(75) Inventors: Rainer Gramss, Iserlohn (DE); Uwe Stapf, Röttingen (DE)

(73) Assignee: ITW Automotive Products GmbH & Co., Iserlohn (DE)

( * ) Notice: Subject to any disclaimer, the term of this patent is extended or adjusted under 35 U.S.C. 154(b) by 235 days.

(21) Appl. No.: 10/771,335

(22) Filed: Feb. 5, 2004

(65) Prior Publication Data

US 2004/0163732 A1 Aug. 26, 2004

(30) Foreign Application Priority Data

Feb. 21, 2003 (DE) .......................... 103 07 355

(51) Int. Cl.
*B65B 1/04* (2006.01)

(52) U.S. Cl. ...................... 141/350; 141/301; 220/86.2; 220/DIG. 33

(58) Field of Classification Search ................. 141/301, 141/350, 349, 302; 220/86.2, DIG. 33; 137/588
See application file for complete search history.

(56) References Cited

U.S. PATENT DOCUMENTS

| 4,091,959 | A | * | 5/1978 | O'Banion | .................. 220/86.2 |
| 5,056,570 | A | | 10/1991 | Harris et al. | |
| 5,071,018 | A | | 12/1991 | Moore | |
| 5,145,081 | A | | 9/1992 | Gravino | |
| 5,271,438 | A | | 12/1993 | Griffin et al. | |
| 5,282,497 | A | | 2/1994 | Allison | |
| 5,730,194 | A | * | 3/1998 | Foltz | ........................... 141/301 |
| 6,009,920 | A | | 1/2000 | Palvoelgyi et al. | |
| 6,092,685 | A | | 7/2000 | Gruber | |
| 6,155,316 | A | | 12/2000 | Benjey | |
| 6,230,739 | B1 | | 5/2001 | Gericke | |
| 6,539,990 | B1 | * | 4/2003 | Levey et al. | ................. 141/301 |

FOREIGN PATENT DOCUMENTS

| EP | 0 498 070 | 8/1992 |
| EP | 0 612 639 | 8/1994 |
| FR | 2 753 139 | 3/1998 |
| FR | 2 761 934 | 10/1998 |
| FR | 2 772 679 | 6/1999 |
| WO | WO 02/26515 | 4/2002 |

* cited by examiner

Primary Examiner—Khoa D. Huynh
(74) Attorney, Agent, or Firm—Lowe, Hauptman & Berner, LLP

(57) ABSTRACT

A closing mechanism for a filling tube of a fuel tank in an automobile, including: a first housing portion adapted to be fastened in an opening of the body of the automobile, a closing slide member which supported for linear or pivotal, movement transverse to the axis of the opening, the closing slide member and a portion of the housing portion together form a funnel-like guide means such that upon a movement of a fuel nozzle towards the guide means the closing slide member is moved into an open position whereby the nozzle can be moved further into the opening, a second housing portion having a first end connectable to the first housing portion and a second end attachable to the end of the filling tube, the second housing portion having a second opening aligned with the first opening, and a closing flap for the second opening.

6 Claims, 5 Drawing Sheets

CLOSING DEVICE FOR A FILING TUBE OF A FUEL TANK IN AN AUTOMOBILE

BACKGROUND

The invention relates to a closing device for a filling tube of a fuel tank in an automobile according to claim 1.

It is known to sealingly join the filling tube of a fuel tank in an automobile to a socket of a trough in the body which, in turn is outwardly opened and can be closed, for example, by a flap or threaded plug. It is further known to form this trough as a separate plastic component which can be snappingly inserted into the body opening. There are increasing demands that such devices should be formed so as to allow for automatic fuelling. There is a further demand that no fuel should leak out in a normal operation. In addition, impurities are to be prevented from getting into the tank from outside. Finally, arrangements are to be made for fuel residues left from fuelling, which collect in the lower area of the trough, to be discharged downwards.

From FR 27 61 934, it has become known to provide a closing flap at the end of a filling tube for a fuel tank in an automobile. The flap opens inwardly and is provided with a sealing which interacts with a sealing edge in the interior of the socket. During fuelling, the flap is pivoted open by means of the fuel nozzle against the force of a spring. Achieving sufficient sealing requires that the closing force of the spring be of a certain magnitude. However, its disadvantage is that the fuel nozzle needs to be pushed in at a considerable force to open the closing flap. Pulling the fuel nozzle out also involves problems because the spring-loaded closing flap counteracts it by a resistance. A further disadvantage is that the constructional expenditure is rather large for a flap and a spring.

SUMMARY OF THE INVENTION

It is the object of the invention to provide a closing device for a filling tube of a fuel tank in an automobile which both achieves an efficient protection from external influences and makes it comfortable to handle the fuel nozzle during fuelling. Finally, it intends to allow for automatic fuelling, but specifically for high operational comfort because the filling position for the fuel nozzle can be easily found and insertion forces are low.

The object is achieved by the features of claim 1.

In the inventive device, a cup-shaped first housing portion is provided which is adapted to be fastened in an opening of the body of the automobile. The first housing portion is preferably made of a plastic material and defines the trough in the body which can be closed to the outside by a flap. At the bottom, the cup-shaped housing portion has an opening which is aligned with the filling tube of the tank. The cup-shaped first housing portion supports a closing slide member on the side of the opening facing the filling tube. The closing slide member can be a linear slide member or rotary slide member which closes the opening in the closing position and opens it in the opening position. The closing slide member is biased towards the closing position by means of a spring. The direction of movement of the closing slide member is in a plane transverse to the axis of the opening.

The closing slide member is shaped with a portion fixed to the housing in such a way that a funnel-like guide means is formed such that when the fuel nozzle is moved into the guide means against the slide member the latter is moved to the opening position. The guide means portion fixed to the housing causes the fuel nozzle to perform a sideward movement parallel to itself which supports the opening movement of the closing slide member. The ramp-like shape of the guide portion on the closing slide member also produces a transverse force component in the opening direction of the closing slide member. Thus, when the closing slide member opens the fuel nozzle moves axially and transversely to its axis until it can be advanced farther towards the filling tube of the tank through the opening.

The forces to be exerted for this action are small because the function of the closing slide member merely is to prevent adverse influences coming from outside, particularly to prevent dirt from entering. Since the first housing portion causes an automatic guidance of the fuel nozzle the operator can easily discover the filling opening by means of the fuel nozzle. This option also makes it easier to use an automatic fuelling plant.

Further, the inventive device provides for a tube-like second housing portion which has a first end and a second end. The first end is connectable to the first housing portion in the area of the bottom of the first housing portion whereas the second end is sealingly attachable to the end of the filling tube. The second housing portion has a through duct or line portion. Thus, in the area of the first end, it also has an opening which is aligned with the opening in the first housing portion. This opening can be closed by a closing flap which is pivotally supported by the second housing portion and is biased towards the closing position by means of a spring. The arrangement of this closing flap is comparable to the one which was described previously with reference to FR 27 61 934. Thus, it rests on an inner sealing edge of the second housing portion and is pivoted to the opening position by contacting the fuel nozzle. This spring-loaded sealing flap is protected from adverse influences from outside by being positioned behind the closing slide member and can be intentionally designed for its purpose of preventing fuel from leaking out of the tank. The flap need not serve for decorative purposes which often detracts from the functionality of such flaps. For the mentioned reason, the closing spring of the closing flap can be dimensioned to be distinctly weaker than is the case for known closing flaps. This increases the operational comfort during both the insertion and retraction of the fuel nozzle.

In the inventive device, two sealing planes are obtained which are optimized each with regard to their operation. The result is a large degree of operational comfort, particularly an easy discovery of the filling position, a small force for insertion, and an easy extraction of the fuel nozzle.

In an aspect of the invention, the first and second housing portions can be integrally formed from a suitable plastic material. However, this embodiment can only be used when it can be inserted into the opening of the body from inside. This is impossible in many motor vehicles. Therefore, an alternative embodiment provides for the first and second housing portions to exist in two parts. During assembly, they require to be joined to each other, e.g. via a snapping connection or even by an adhesive.

BRIEF DESCRIPTION OF THE DRAWINGS

The invention will be described in more detail below with reference to an embodiment shown in the drawings.

DETAILED DESCRIPTION OF THE INVENTION

Figure 1:
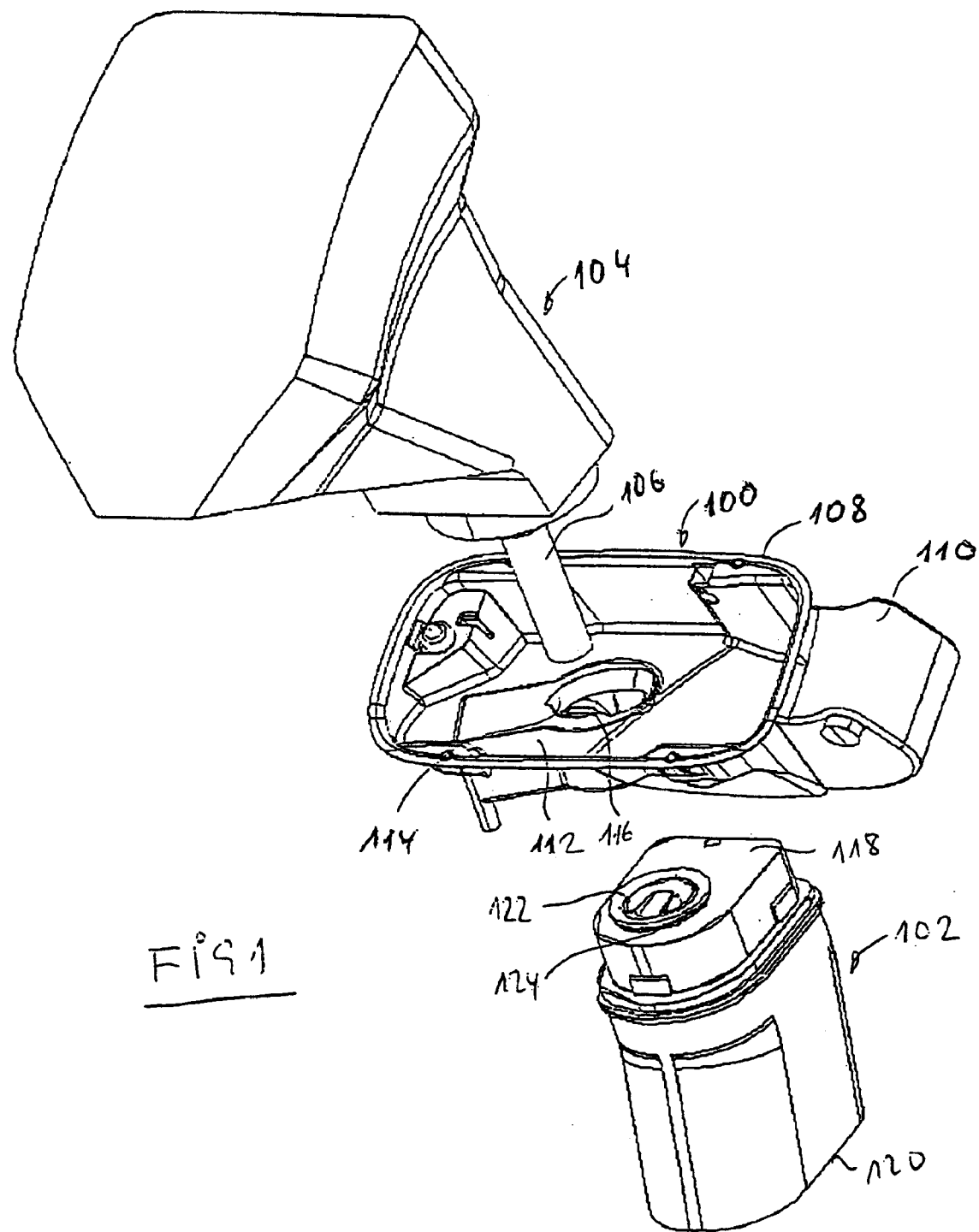
FIG. 1 shows an exploded representation of a device according to the invention in a perspective view.

Referring to FIG. 1, a cup-shaped first portion 100 and an approximately tube-like second portion 102 can be seen. The housing portions 100, 102 are joined to each other during assembly, reference to which will be made later below. Besides, a fuel nozzle 104 with a filling tube 106 can be seen in FIG. 1. The cup-shaped housing portion 100 has a circumferential wall 108 the edge of which can be mounted in the opening of an automobile body which is not shown, e.g. by means of a snapping connection. The housing portion 100 which is integrally formed, for example, from a plastic material, has a lateral projection 110 by which a flap can be supported, which is not shown and by which the opening in the body can be closed.

The bottom 112 of the housing portion 100 has provided therein a slightly oval opening 114. It serves as a target opening for the filling tube 106 of the fuel nozzle 104. A closing slide member 116 is outlined below the opening 114. Reference to the construction and operation of such a slide member will be made below in connection with FIGS. 5 and 6. The function of the closing slide member 116 is to seal an opening which is located on the opposite side of the closing slide member 116 and is not shown, in its closing position. The closing slide member 116 is supported either linearly or pivotably in a plane transverse to the axis of the opening 114 in the housing portion 100.

In FIG. 1, the second housing portion 102 has an upper end and a lower end 118, 120. The end 120 is sealingly joined to the associated end of the filling tube, which is not shown, of an automobile tank. The upper end 118 is closed except for an opening 122 which is sealingly closable by a closing flap 124. The closing flap 124 is biased towards the closing position by means of a spring.

Figure 2:
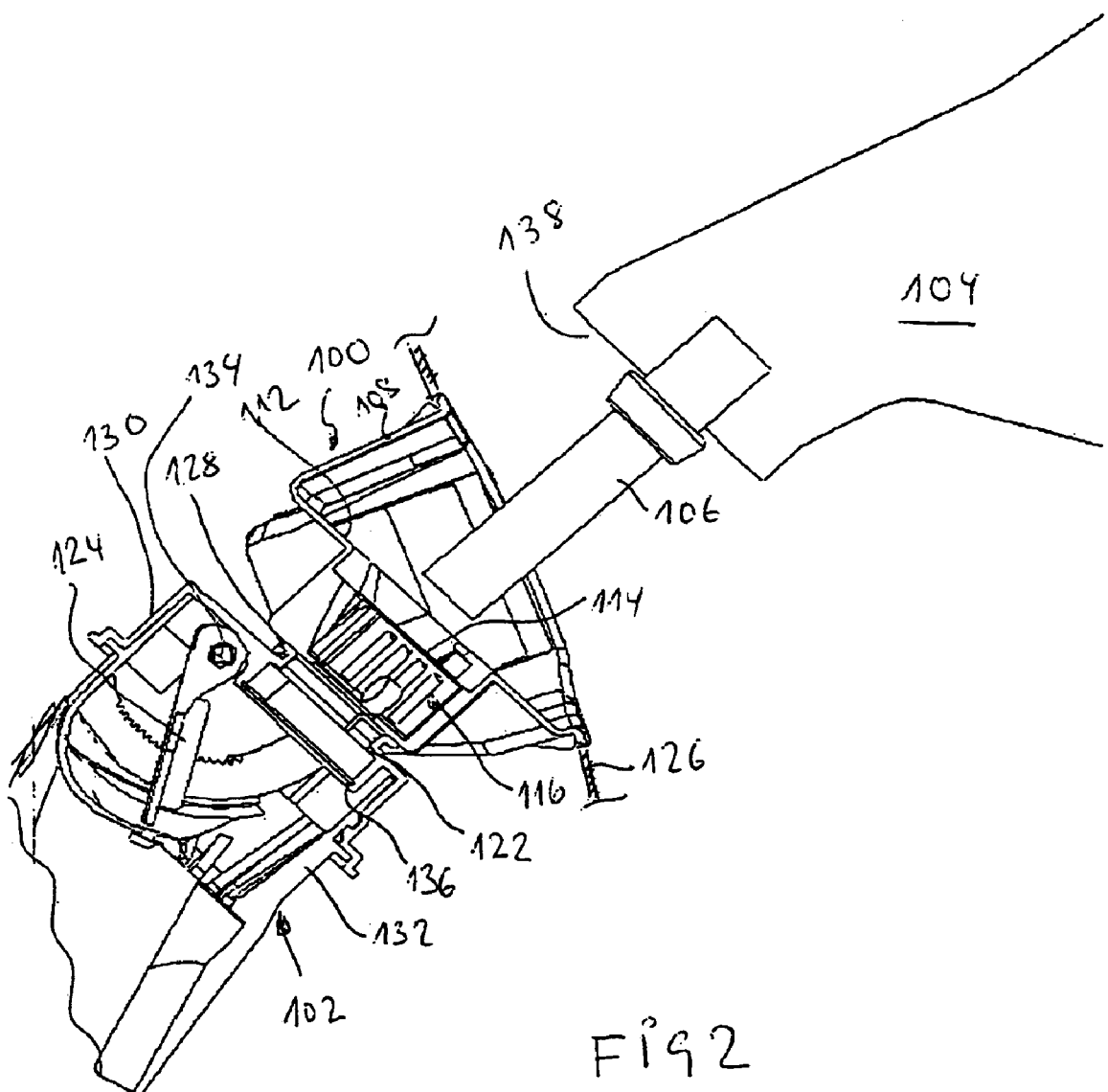
FIG. 2 shows the assembled device of FIG. 1, partially in section, prior to the complete insertion of a fuel nozzle.

In FIG. 2, it can be appreciated that the housing portion 100 is snappingly arranged in an opening of a body. The body sheet metal 126 is outlined on the two sides. Further, it can be recognized that the housing portions 100 and 102 are joined to each other at 128. The way of joining them is not illustrated in detail. The second housing portion 102 is comprised of a cap-shaped upper portion 130 and a tube-like lower portion 132 which are joined to each other in an appropriate way. However, it can also be contemplated to form the two parts integrally as one unit.

In FIG. 2, it can also be appreciated that that the closing flap 124 is pivotally supported about a transversely extending axis 134 in the interior of the housing portion 102. A spring, which is not shown, applies a force to the flap 124 towards a sealing edge 136 below the opening 122. The flap 124 is not shown in FIG. 2 for reasons of representation, although the fuel nozzle 104 is not introduced yet completely. FIG. 2 also outlines the closing slide member 116 which is in the closing position.

Figure 3:
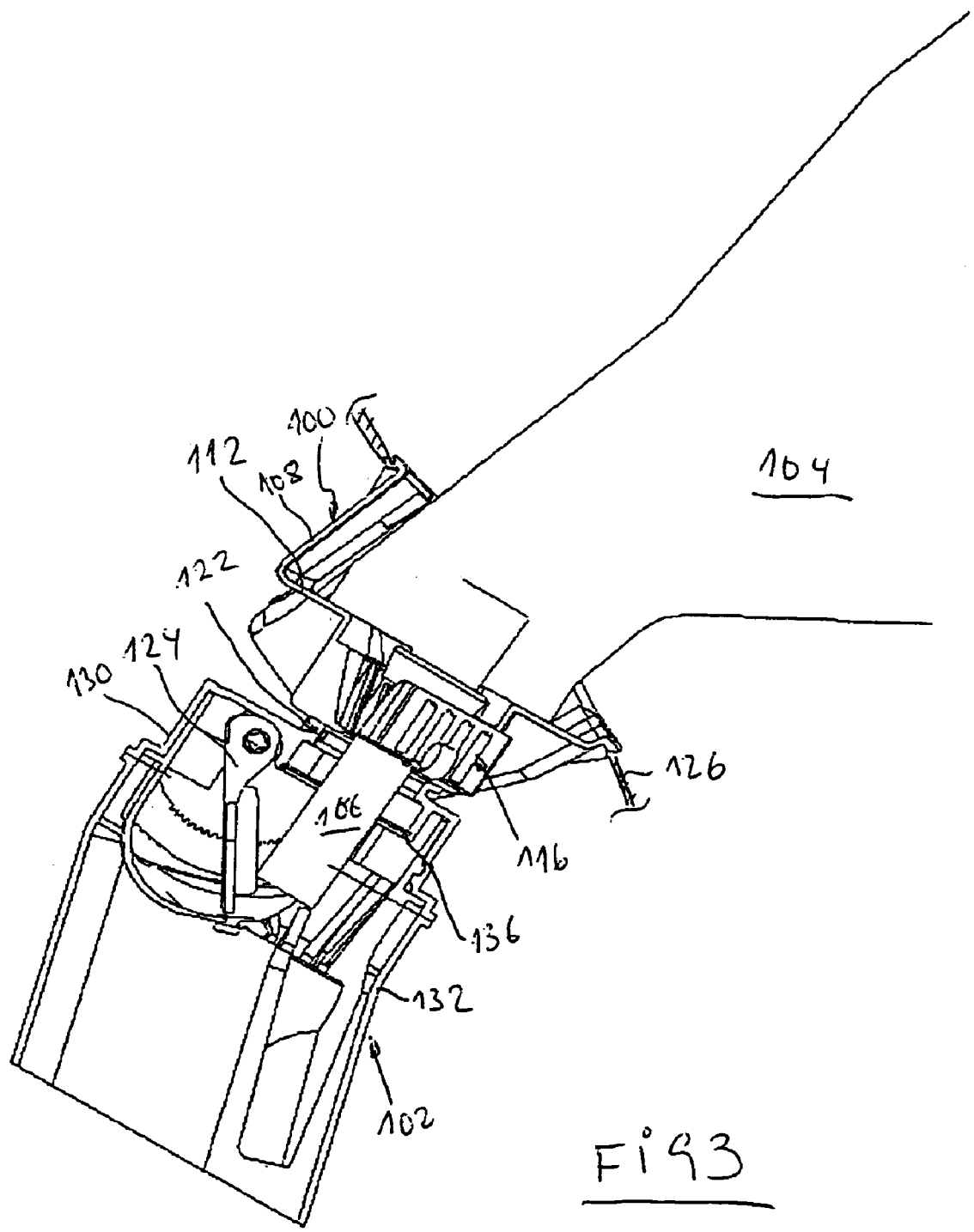
FIG. 3 shows the representation of FIG. 2 with a fuel nozzle being inserted.

The fuel nozzle 104 has been introduced completely in FIG. 3 with a shoulder of the fuel nozzle 104 138 being caused to bear against the bottom 112. At this point, the filling tube 106 has pivoted the closing slide member 116 sidewards and the closing flap 124 to the opening position.

Figure 4:
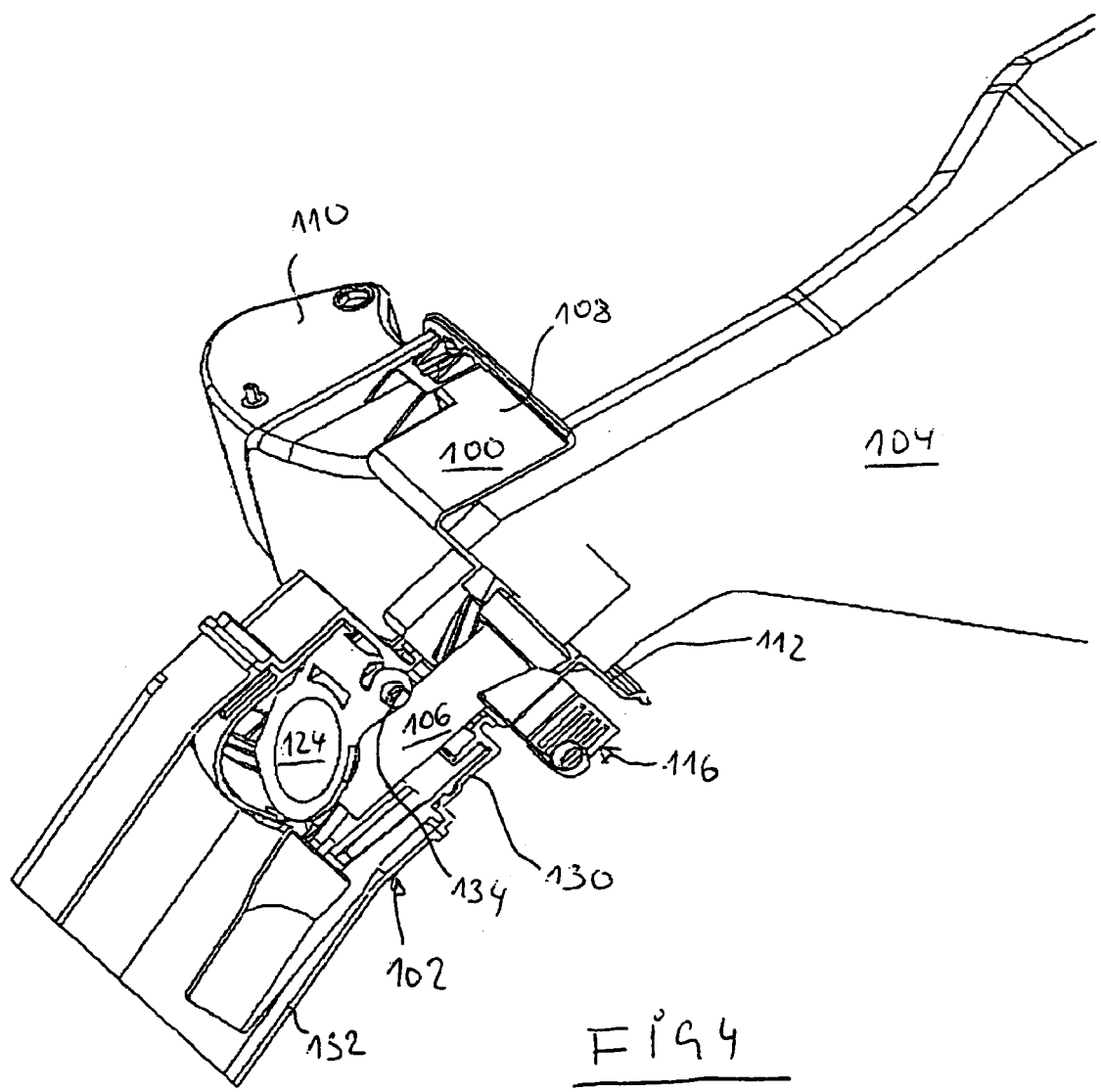
FIG. 4 shows a representation of the device of FIG. 3 as rotated through 90° in an approximately perspective view and partially in section.

The actuation of the device as shown in FIG. 3 can also be deduced from FIG. 4 in a somewhat different perspective view. More detailed explanations appear unnecessary here. The closing slide member 116 can either be linearly movable transversely to the filling direction or can be pivotable in a plane transverse to the filling direction. The latter is evident more clearly from FIGS. 5 and 6 in which, however, some elements are illustrated to differ from those of FIGS. 1 to 4 so that they are given different reference numbers.

A cup-shaped or through-shaped housing portion 40 is also mountable, using appropriate means, in an opening of an automobile body, which is not shown. The trough defined by the housing portion 40 is indicated by 42. At the bottom 60 of the trough, an opening 46 is shown which can be closed by means of a closing slide member 68. The closing slide member 68 is shown in the closing position in FIG. 5 and in the opening position in FIG. 6. The closing slide member 68 has an arm 62 which is pivotally supported by the bottom 60 at 66 by means of a pin. A spring 88 biases the closing slide member 68 towards the closing position shown in FIG. 5. In the opening position of FIG. 6, the opening 60 in the bottom 60 is oriented to an opening 16 which is provided at the associated end in the second housing portion 30 and is closable by a closing flap of FIGS. 1 to 4, which is not shown here. As can further be seen from FIGS. 5 and 6 the second housing portion 30, at the other end, is joined to a filling tube 14 which is led to the tank of the automobile, which is not shown.

Figure 5:
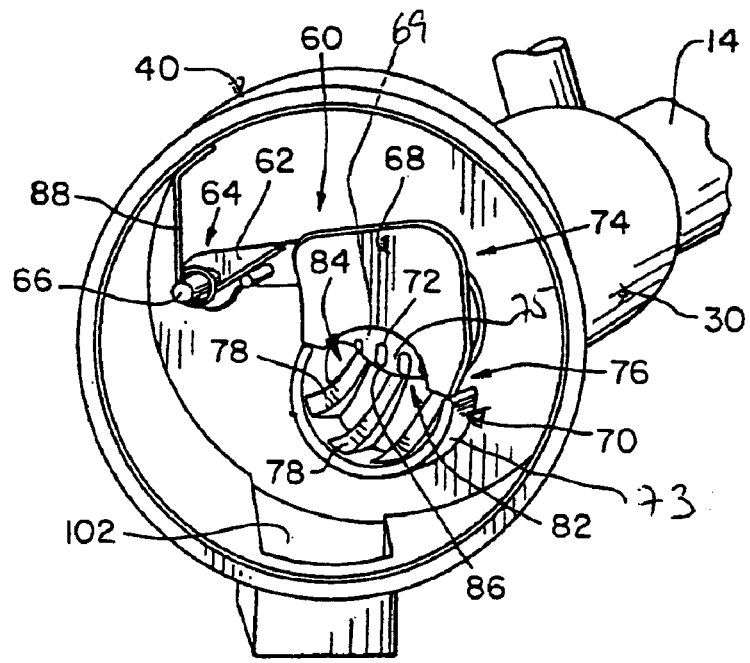
FIG. 5 shows a second embodiment of the invention in a perspective front view.
Figure 6:
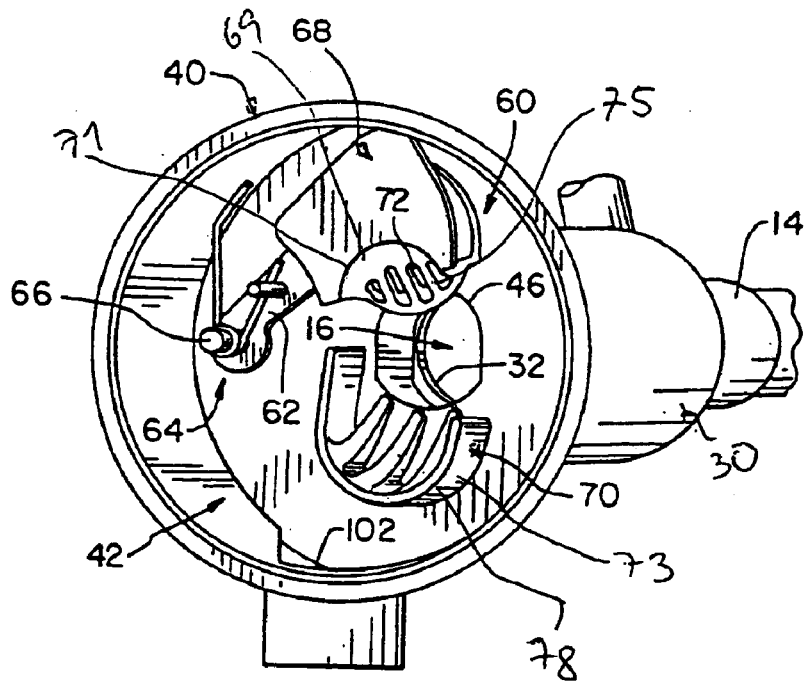
FIG. 6 shows the representation of FIG. 5 with the closing slide member opened.

FIGS. 5 and 6 further allow to appreciate that the bottom 60 has formed thereon a portion 70 which is shaped with a plurality of ribs 78 which are parallel and are disposed at a spacing from each other. The ribs are configured in a ramp-like manner in a way to lower their height in a wedge shape towards the opening 46. The ribs are fastened to an arcuate edge 73 at the higher end.

The closing slide member 68 has a through type indentation 69 with an arcuate edge 71 on the side facing the ribs 78. The indentation 69 has parallel ribs 75 between which slots 72 are disposed. When the closing slide member 68 is in a closed condition the concave indentation 69, along with the concave upper side of the ribs 78, defines a through-shaped funnel-like indentation. When the fuel nozzle illustrated in the other Figures passes its filling tube through an opening which is arranged in a cover sheet, which is not shown, in the trough, thus covering the slide member 68 in part and the remaining components of the bottom 60, the free end of the filling tube moves against the upper side of the ribs 78 while sliding towards the indentation 69 of the covering slide member 68, which causes a transversal force component to be produced thereon which pivots the covering slide member 68 in a counterclockwise direction as is shown in FIG. 6. An additional transversal force component is also produced by some portion of the edge of the filling tube that comes to bear against the concave surface of the indentation 69. Hence, it can be seen that the filling tube, when moved in the manner described, initially undergoes a sideward movement before it can be oriented to the opening 46 and be introduced therein with the slide member 68 pivoted away as was discussed already in connection with FIGS. 1 to 4.

The slots 72 provided in the covering slide member 68 are opened downwardly and allow the run-down of fuel which unintentionally exits the fuel nozzle in this portion. The portion 70 further provides openings (not shown) which open downwardly, allowing fuel gathered in the trough 42 to flow downwards and to the outside via a drain 102.

A closing slide member has been described in FIGS. 5 and 6 which is designed as a rotary slide member. It is understood that a linear slide member can also be used for the operation of such a closing member. Its function merely is to prevent impurities from getting into the tank from outside. It opens solely when the filling tube of the fuel nozzle is inserted in the manner described. In contrast, the outflow of fuel from the tank, which is not shown, is prevented by the closing flap which is disposed in the interior of the second housing portion 102 and 30 each.

What is claimed is:

1. A closing mechanism for a filling tube of a fuel tank in an automobile, comprising:

a cup-shaped first housing portion adapted to be fastened in an opening of the body of the automobile and having a bottom portion which is aligned with the filling tube, a closing slide member which on the side of the opening facing the filling tube is supported for linear or pivotal, movement by the first housing portion, the closing slide member being further moveable in a plane transverse to the longitudinal axis of the opening and being biased towards a closing position by a spring, whereby when the opening is closed, the closing slide member and a portion formed on said bottom portion of the first housing portion together form a funnel-like guide means such that upon a movement of the end of a pipe of a fuel nozzle towards the guide means the closing slide member is moved into an open position whereby the nozzle is moved further into the opening, a tube-like second housing portion having a first and a second end, the first end being connectable to the first housing portion in the range of the bottom portion and the second end being sealingly attachable to the end of the filling tube, the second housing portion having a second opening in the range of the first end aligned with the first opening and a closing flap member for the second opening which is pivotally supported in the second housing portion and biased by spring means towards a closing position wherein the closing flap member engages a sealing edge on the side of the opening facing the tank, with the closing flap member being adapted to be pivoted into the open position by the fuel nozzle.

2. The closing mechanism of claim 1, wherein the closing slide member and the portion of the housing each are provided with ribs which in order to form the guide means are being provided with a ramp-shaped slope towards each other.

3. The closing mechanism of claim 1, wherein, in the area of the guide means, slots are provided which are connected with a drain for fuel.

4. The closing mechanism of claim 1, wherein the closing flap member has a flat elevation which is designed to form an abutment or sliding surface for the front end of the nozzle.

5. The closing mechanism of claim 1, wherein first and second housing portion are integrally formed.

6. The closing mechanism of claim 1, wherein the first and second housing portion are separately formed and connected by a snapping connection or by an adhesive, respectively.

* * * * *